US011281206B2

(12) United States Patent
Candido et al.

(10) Patent No.: US 11,281,206 B2
(45) Date of Patent: Mar. 22, 2022

(54) DELIVERING CONNECTIVITY TO A SERVICE AREA BY AERIAL VEHICLES USING PROBABILISTIC METHODS

(71) Applicant: SoftBank Corp., Tokyo (JP)

(72) Inventors: Salvatore J. Candido, Mountain View, CA (US); Sameera Sylvia Ponda, Mountain View, CA (US)

(73) Assignee: SoftBank Corp., Tokyo (JP)

( * ) Notice: Subject to any disclaimer, the term of this patent is extended or adjusted under 35 U.S.C. 154(b) by 214 days.

(21) Appl. No.: 16/728,771

(22) Filed: Dec. 27, 2019

(65) Prior Publication Data

US 2021/0200204 A1 Jul. 1, 2021

(51) Int. Cl.
*G05D 1/00* (2006.01)
*G01W 1/10* (2006.01)
*G05D 1/06* (2006.01)
*G08G 5/00* (2006.01)

(52) U.S. Cl.
CPC ............ *G05D 1/0027* (2013.01); *G01W 1/10* (2013.01); *G05D 1/0615* (2013.01); *G08G 5/003* (2013.01); *G08G 5/0043* (2013.01)

(58) Field of Classification Search
CPC ....... G06T 7/0002; G06T 5/002; G06T 5/003; G06T 5/40; G06T 2207/30168; G06T 2207/10016; G06T 2207/20076; G06T 2207/20084; G06T 2207/20072; G06T 2207/20004; G06T 5/001; H04N 21/44008; H04N 7/0127; G09G 5/005; G06N 3/08
USPC .......................................................... 701/3
See application file for complete search history.

(56) References Cited

U.S. PATENT DOCUMENTS

| 7,469,857 | B2* | 12/2008 | Voss | B64B 1/60 244/96 |
| 9,628,395 | B1* | 4/2017 | Teller | G06F 3/0484 |
| 9,635,706 | B1* | 4/2017 | Bonawitz | H04W 84/18 |
| 11,015,935 | B2* | 5/2021 | Candido | B64C 39/024 |
| 2011/0147513 | A1* | 6/2011 | Surmont | B64B 1/50 244/33 |
| 2012/0256770 | A1* | 10/2012 | Mitchell | G08G 1/127 340/989 |
| 2014/0188377 | A1* | 7/2014 | Bonawitz | H04B 7/18504 701/120 |
| 2017/0278405 | A1 | 9/2017 | Yakan | |
| 2018/0357909 | A1 | 12/2018 | Eyhorn | |

(Continued)

OTHER PUBLICATIONS

International Search Report and Written Opinion for Application No. PCT/US20/63800 dated Feb. 19, 2021.

*Primary Examiner* — Muhammad Shafi
(74) *Attorney, Agent, or Firm* — Botos Churchill IP Law

(57) ABSTRACT

Methods and systems for controlling a group of aerial vehicles to meet a connectivity service objective are provided. A method may include causing aerial vehicles in the group to arrive at a target service area during a given arrival time window associated with the connectivity service objective, which may indicate a desired probability of service coverage of the target service area. The method further includes calculating a probability of service coverage of the target service area for the vehicles for a time period after the vehicles are expected to arrive at the target service area, determining whether the probability of service coverage meets a threshold, and causing the vehicles to operate according to a station seeking flight policy during the time period.

22 Claims, 9 Drawing Sheets

(56) References Cited

U.S. PATENT DOCUMENTS

2019/0185158 A1 6/2019 Blake et al.
2019/0281471 A1* 9/2019 Candido ............... H04W 16/18

* cited by examiner

DELIVERING CONNECTIVITY TO A SERVICE AREA BY AERIAL VEHICLES USING PROBABILISTIC METHODS

BACKGROUND OF INVENTION

The demand for data connectivity via the Internet, cellular data networks, and other such networks, is growing. However, in many areas of the world, data connectivity is still unavailable or unreliable due to the difficulty of installing conventional ground infrastructure. Accordingly, different methods of providing network infrastructure is desirable.

One method of providing data connectivity, apart from conventional cellular, cable, fiber, and other broadband and Internet infrastructure, uses aerial vehicles equipped with communications units for receiving and transmitting radio frequency or optical data. Typically, aerial vehicles travel according to trajectories specified in advance by a flight plan with time, speed, direction, location and other states of the vehicles determined within a small error range. Lighter-than-air (i.e., floating or gliding vehicles, such as balloons, gliders, drones with gliding capabilities) vehicles travel using wind patterns, and thus their trajectories cannot be planned in the same manner since they are influenced by, and sometimes adapt to, meteorological forces that are not well-predicted in advance of the flight. In other words, wind drive vehicles are largely navigated by forces that are not predicted accurately.

Groups of lighter-than-air vehicles also are used in other applications, such as observing the earth, meteorological data collection, among other types of data collection, and conventional techniques have difficulty delivering such services in a consistent manner in view of said unpredictable wind and meteorological forces.

Thus, there is a need for improved techniques for planning for, and delivering, services to a target service area by aerial vehicles.

BRIEF SUMMARY

The present disclosure provides for systems and methods for controlling a group of aerial vehicles to meet a connectivity service objective. A method for controlling a group of aerial vehicles includes causing two or more aerial vehicles in the group to arrive at a target service area during a given arrival time window associated with the connectivity service objective, the connectivity service objective comprising a desired probability of service coverage of the target service area; calculating a probability of service coverage of the target service area for the two or more vehicles for a first time period after the two or more vehicles are expected to arrive at the target service area; determining whether the probability of service coverage meets a probability of coverage threshold; and causing the two or more vehicles to operate according to a station seeking flight policy during the first time period.

In an example, the connectivity service objective further specifies a desired level of service. In another example, the desired level of service is based on a demand for connectivity service. In another example, causing the two or more vehicles to operate according to the station seeking flight policy occurs in response to a determination that the probability of service coverage meets the probability of coverage threshold. In another example, the method further comprises determining whether a forecasted wind pattern is favorable for station seeking, wherein causing the two or more vehicles to operate according to the station seeking flight policy occurs in response to a determination that the forecasted wind pattern is favorable for station seeking. In another example, the method further comprises, wherein the probability of service coverage does not meet the probability of coverage threshold, calculating a minimum number of additional vehicles necessary to meet the probability of coverage threshold; causing one or more additional vehicles equal to the minimum number of additional vehicles to travel to the target service area; and causing the one or more additional vehicles to operate according to a station seeking flight policy during a remainder of the first time period. In another example, the group of aerial vehicles comprises two or more heterogeneous aerial vehicles. In an example, the group of aerial vehicles comprises two or more non-interdependent aerial vehicles. In another example, the group of aerial vehicles comprises at least one balloon. In another example, the group of aerial vehicles comprises at least one fixed wing high altitude aerial vehicle. In another example, the given arrival time window overlaps with a start of connectivity service specified by the connectivity service objective. In another example, the first time period overlaps with the given arrival time window. In another example, the station seeking flight policy comprises a neural network encoding a flight policy optimizing for remaining within the target service area for the first time period. In another example, the station seeking flight policy is configured to output a set of actions for the two or more aerial vehicles to take in order to remain within or near the target service area for the first time period. In another example, the station seeking flight policy is configured to output a set of commands configured to cause the two or more aerial vehicles to take one or more actions in order to remain within or near the target service area for the first time period. In another example, the station seeking flight policy is configured to select a heading based on input indicating: a location and an altitude of each of the two or more aerial vehicles, wind pattern data for the location and the altitude, and a destination, wherein the destination is associated with the target service area. In another example, the station seeking flight policy is configured to adjust an altitude of each of the two or more aerial vehicle.

In another example, the method further comprises selecting a subgroup of lower cost aerial vehicles to service the target service area based on a determination that the probability of service coverage by the subgroup of lower cost aerial vehicles meets the probability of coverage threshold for a second time period; and causing the subgroup of lower cost aerial vehicles to service the target service area for the second time period, wherein the group of aerial vehicles comprises a heterogeneous group of aerial vehicles. In another example, the method further comprises selecting a subgroup of higher cost aerial vehicles to service the target service area based on a determination that the probability of service coverage by the a subgroup of lower cost aerial vehicles does not meet the probability of coverage threshold for a second time period; and causing the subgroup of higher cost aerial vehicles to service the target service area for the second time period, wherein the group of aerial vehicles comprises a heterogeneous group of aerial vehicles.

A computer system includes a memory; one or more processors configured to perform operations for controlling a group of aerial vehicles to meet a connectivity service objective, the one or more processors configured to: cause two or more aerial vehicles in the group to arrive at a target service area during a given arrival time window associated with the connectivity service objective, the connectivity service objective comprising a desired probability of service coverage of the target service area; calculate a probability of service coverage of the target service area for the two or more vehicles for a first time period after the two or more vehicles are expected to arrive at the target service area; determine whether the probability of service coverage meets a probability of coverage threshold; and cause the two or more vehicles to operate according to a station seeking flight policy during the first time period.

Figure 1A:
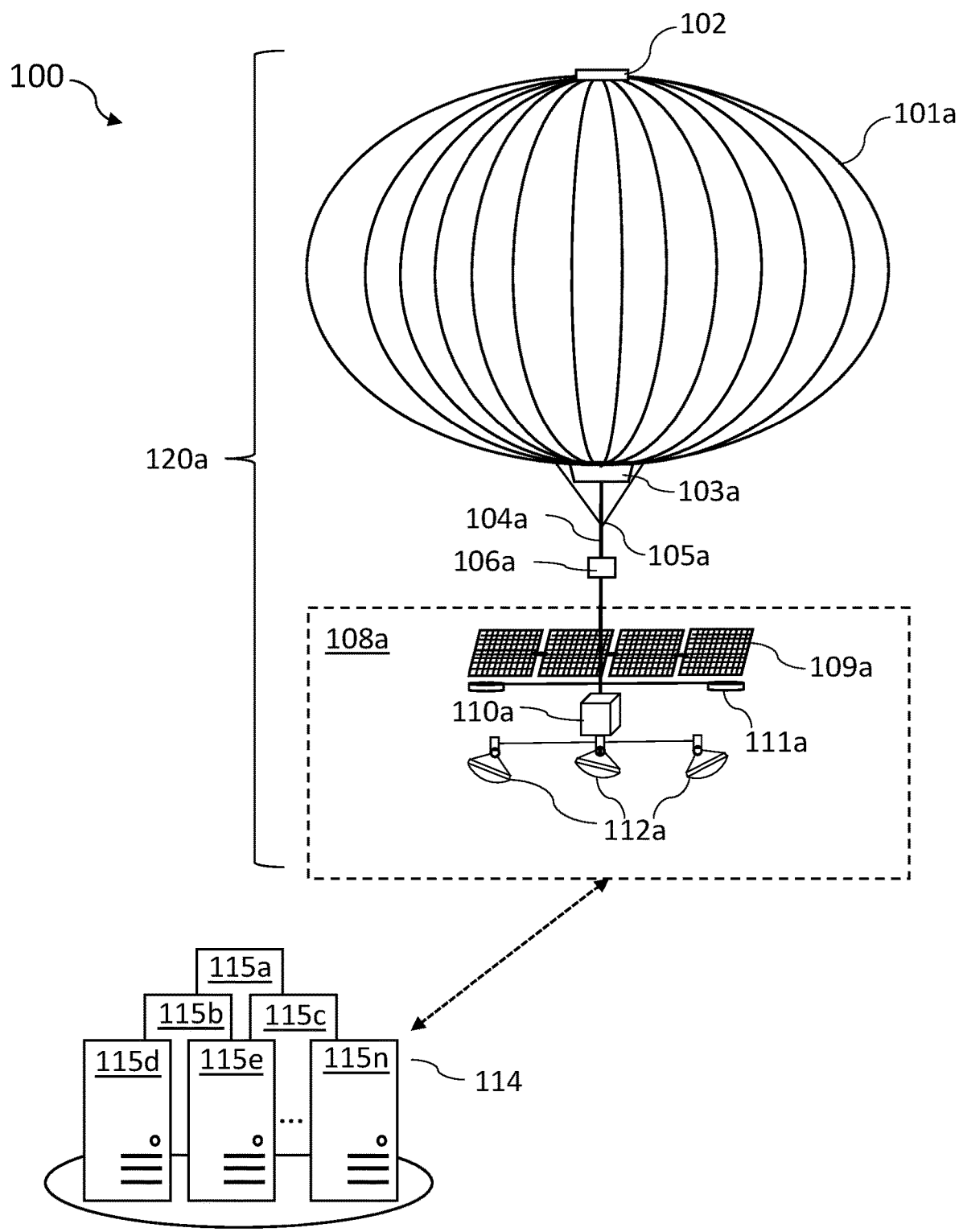
FIGS. 1A-1B are diagrams of exemplary operational systems in which learned flight policies may be implemented for navigating an aerial vehicle, in accordance with one or more embodiments.

The figures depict various example embodiments of the present disclosure for purposes of illustration only. One of ordinary skill in the art will readily recognize from the following discussion that other example embodiments based on alternative structures and methods may be implemented without departing from the principles of this disclosure, and which are encompassed within the scope of this disclosure.

DETAILED DESCRIPTION

The invention is directed to methods for delivering coverage to a service area by aerial vehicles. A system is provided for delivering coverage by aerial vehicles to a service area and managing the airspace in which the fleet is operating. The aerial vehicles may be part of a fleet of aerial vehicles being deployed to deliver coverage to a plurality of service areas around the world.

Trajectories for lighter-than-air vehicles may be simulated based on weather forecasts (including forecasted wind patterns) and characteristics of the vehicle itself. These simulations may include running an aerial vehicle through a group of navigation algorithms (e.g. any deterministic logic, any probabilistic-based logic, and any adaptation to the observed environment) in a given environment. In other examples, these simulations may be run as an ensemble, wherein a plurality of universes are randomly sampled from a prior distribution. Within each universe each vehicle operates according to its algorithms given a forecast and each vehicle's characteristics, and each vehicle adapts to its universe through the course of the simulation. For example, given a current environment, a wind forecast, a vehicle configuration (i.e., set of vehicle characteristics), and a set of navigation algorithms for the vehicle, a simulation may be run, with wind conditions being observed during the simulation and incorporated into a variety of planning algorithms. In examples, this type of simulation may be run a number of times with different environments (e.g., a first environment, second environment, through to an nth environment), different wind forecasts, each simulation producing a different adaptive behavior by the vehicle(s). This generates a distribution of outcomes, from which statistics (e.g. what percentage of the time was my target service area covered) may be computed.

Such simulations may be run for individual vehicles (i.e. single vehicle simulations), or for fleets (i.e. multi-vehicle simulations, where the vehicles have a shared information state, such as shared wind observations, and may also have a shared algorithm).

Such simulations provide probabilities as to an individual lighter-than-air vehicle's ability to achieve an objective—objectives such as providing consistent connectivity services to a target location or area (hereafter referred to as "station") or remaining within a certain distance of a desired point—and for which time periods. When forecasted wind patterns for a given time period predict good station seeking winds (e.g., winds blowing in opposing directions, often at varying altitudes, within a region of the atmosphere, which enable lighter-than-air vehicles to remain within a given area around a station by adjusting their altitude periodically) the airspace and service coverage management system may take a probabilistic approach to planning to achieve an objective.

In an example, a group of aerial vehicles within a fleet may be staged by navigating them to a target region for arrival on a target date and maybe a target time range as well. The group may comprise aerial vehicles that are navigating in an independent (i.e., non-interdependent) manner (i.e., they are navigating independently of each other) based on each vehicle's individual characteristics, starting point, weather forecasts for areas the vehicle will pass through on its way to the destination for the time that the vehicle will be passing through, and other independent factors. Given the wind forecasts for the target date and a time period after, the system may determine that forecasted wind patterns are favorable for lighter-than-air (e.g., floating or gliding) vehicles to station seek for the time period, and allow the group of vehicles to travel according to a station seeking flight policy to achieve an objective to provide coverage to the target area.

In some examples, determining that forecasted wind patterns are favorable for lighter-than-air vehicles to station seek for the time period may include running simulations for at least one lighter-than-air vehicle within a target area (e.g., a predetermined radius) surrounding the station for a given time period, and determining whether one or more simulations results in the lighter-than-air vehicle remaining within the target area for most or all of the given time period. In other examples, simulations may be run for each of a group of lighter-than-air vehicles (e.g., vehicles allocated to an objective related to the target station) to optimize for each vehicle to achieve the objective, and calculating an overall probability of service coverage of a target area for a time period of interest by the group of vehicles based on the resulting individual probabilities of each vehicle being able to provide coverage in that time period of interest (e.g., $P_1$ through $P_n$) for the time period of interest. The resulting probability of service coverage $P_c$ by the fleet during the time period of interest provided by the group of balloons together may be calculated using the following general equation:

$$1-(1-P_1) \times (1-P_2) \ldots \times (1-P_n) = P_c$$

The time-averaged likelihood of a homogenous group of vehicles achieving a particular service coverage objective may be calculated using the following equation:

$$P(c>C) = 1-(1-P_D(d<r))^n$$

where $P_D$ is the histogram of a vehicle's distance from a target location under a particular control strategy, c is the random variable (greater than a desired service coverage threshold C) specifying percentage of time coverage that is achieved, d is the distance of a particular balloon to the target, r is the radius of coverage for the target location (e.g., an LTE antenna radius), and n is the number of vehicles to ensure the probability P of a desired amount of coverage is sufficiently high. In some examples, n may represent a number of homogeneous independent-identically-distributed vehicles (i.e., the vehicles are of the same type and characteristics, but independently operated). Sufficiently large n (number of vehicles) allows sizing the fleet to hit a particular service availability or coverage objective. This allows for planning longer-term time-averaged coverage, in which other aspects of a vehicles flight, such as power consumption, may be managed or optimized, for example, allowing for wind-driven vehicles to travel (i.e., drift) farther from a target location when there are more vehicles (i.e., thus a higher total probability that at least one vehicle will be in a position to provide coverage at any given time) so that each individual vehicle does not need to expend more energy remaining within a smaller radius of the target location. In this example, each vehicle may reserve or redirect more power for communications, longer operation or service times, or other power consuming components or operations. Where you have a group of heterogeneous vehicles, PD may differ for each vehicle or each type of vehicle.

Alternatively, determining that forecasted wind patterns are favorable for station seeking also may be based directly on wind forecasts (e.g., direction and speed of winds) for the time period at or around the station (e.g., certain levels of directionally heterogeneous winds in the forecast may indicate directly that a probabilistic approach is appropriate). Taking into account variations in wind direction and speed, or other aspects of a wind forecast (e.g., ensemble of wind predictions), in various parts of a target area around a station, a determination may be made that there is sufficient wind variability (i.e., chaos) in the forecast to automatically infer that the probabilities of coverage would be sufficiently high (i.e., meets or exceeds a probability of service coverage threshold) for lighter-than-air vehicles to navigate according to a station seeking flight policy. Such a determination may be made based on test, simulation and/or historical data correlating wind patterns to station seeking performance. In other examples, such a determination may be made based on a categorization algorithm, a steering potential metric, or a machine-learning-based trained neural net that takes in a wind forecast and estimates steering potential. In some examples, after the determination is made that wind forecasts for the time period are favorable for station seeking, coverage probability Pc or P(c>C) may be calculated to confirm that a probability of coverage threshold can be met by a group of n lighter-than-air vehicles (e.g., according to one or more of the equations above). As used herein, "meeting" a threshold, or any variation thereof, means to meet or exceed a threshold as may be required or defined in a connectivity service planning system.

During such time periods where forecasted wind patterns are favorable for station seeking (i.e., sufficient variability for high steering potential, as described in more detail below), the system does not need to schedule or plan a detailed (e.g., minute by minute) planned flight trajectory for a particular vehicle, or for each vehicle in a group, to service the target area for the entirety of a time period or a designated portion of a time period (i.e., schedule for vehicles to arrive at a target location in serial each to service for a window of time, for example, until a next vehicle arrives). Instead the system can rely on the probabilistic behavior of each vehicle acting independently to achieve the group coverage (or other) objective. However, there may be other time periods when the system determines the forecasted wind patterns are not favorable for lighter-than-air vehicles to station seek individually according to a station seeking flight policy (i.e., low steering potential), and for another time period, the system may change its approach from determining an overall probability of service coverage by a group of vehicles for a target area to planning for individual vehicles to service the target area for particular portions of this other time period.

In further embodiments, the system may tune controllers to plan for connectivity service objectives based on varying levels and characteristics of wind. Machine-learned or classical controllers may be tuned for groups of vehicles having complementary characteristics, which together can satisfy a service coverage objective. For example, aerial vehicles with no lateral control may be scheduled for times when steering potential is high (i.e., favorable station seeking winds), and lateral-control equipped vehicles may be scheduled for times when the steering potential is medium. In other examples, you may combine multiple probability equations.

This probabilistic approach further enables the system to tune controllers to plan based on levels and characteristics of wind.

Example Systems

Figure 1B:
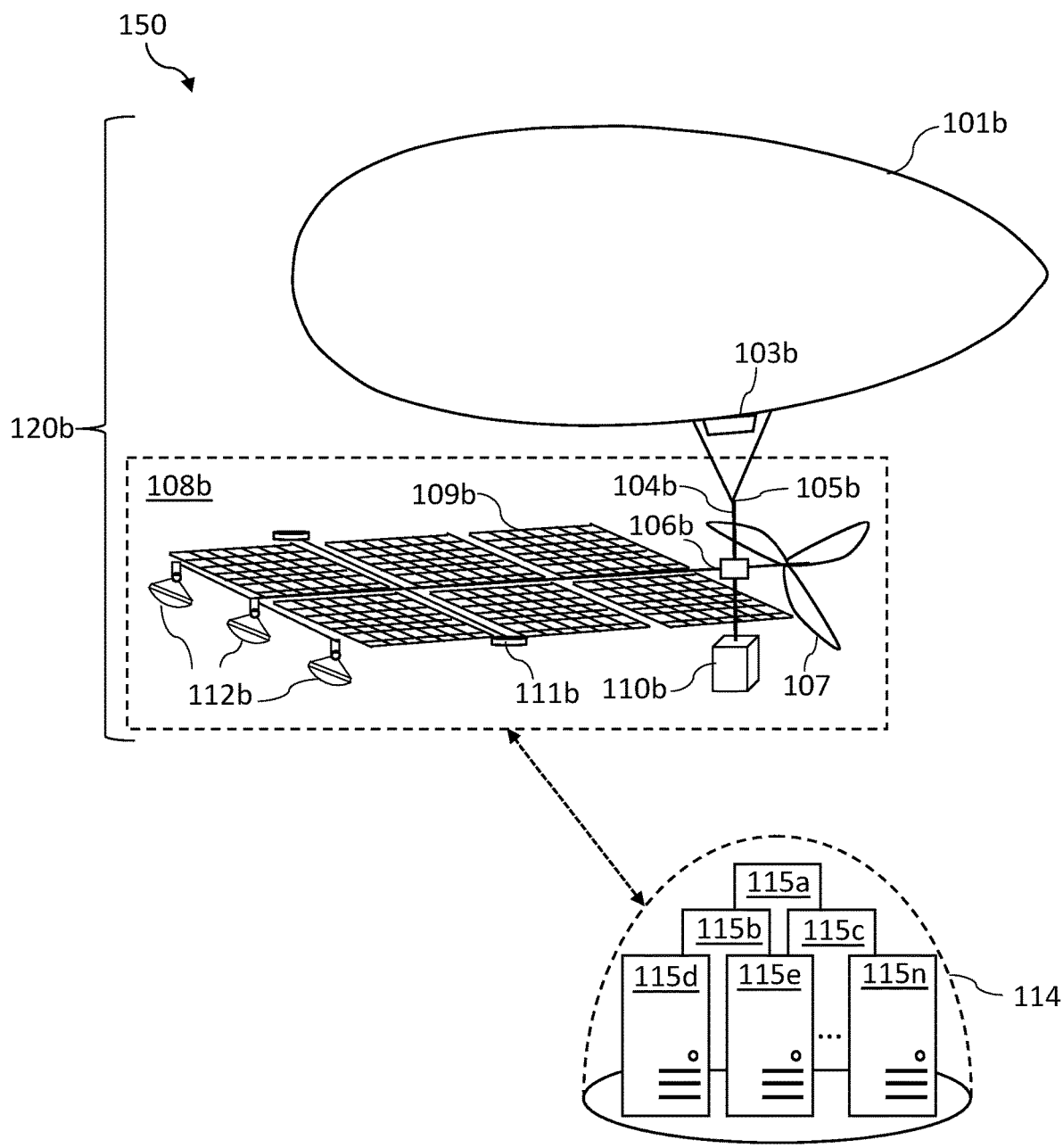

FIGS. 1A-1B are diagrams of exemplary operational systems in which flight policies may be implemented for navigating an aerial vehicle, in accordance with one or more embodiments. In FIG. 1A, there is shown a diagram of system 100 for navigation of aerial vehicle 120a. In some examples, aerial vehicle 120a may be a passive vehicle (e.g., balloon, glider, or (pseudo-)satellite), wherein most of its directional movement is a result of environmental forces, such as wind and gravity. In other examples, aerial vehicles 120a may be actively propelled (i.e., powered). In an embodiment, system 100 may include aerial vehicle 120a and ground station 114. In this embodiment, aerial vehicle 120a may include balloon 101a, plate 102, altitude control system (ACS) 103a, connection 104a, joint 105a, actuation module 106a, and payload 108a. In some examples, plate 102 may provide structural and electrical connections and infrastructure. Plate 102 may be positioned at the apex of balloon 101a and may serve to couple together various parts of balloon 101a. In other examples, plate 102 also may include a flight termination unit, such as one or more blades and an actuator to selectively cut a portion and/or a layer of balloon 101a. ACS 103a may include structural and electrical connections and infrastructure, including components (e.g., fans, valves, actuators, etc.) used to, for example, add and remove air from balloon 101a (i.e., in some examples, balloon 101a may include an interior ballonet within its outer, more rigid shell that is inflated and deflated), causing balloon 101a to ascend or descend, for example, to catch stratospheric winds to move in a desired direction. Balloon 101a may comprise a balloon envelope comprised of lightweight and/or flexible latex or rubber materials (e.g., polyethylene, polyethylene terephthalate, chloroprene), tendons (e.g., attached at one end to plate 102 and at another end to ACS 103a) to provide strength to the balloon structure, a ballonet, along with other structural components.

Connection 104a may structurally, electrically, and communicatively, connect balloon 101a and/or ACS 103a to various components comprising payload 108a. In some examples, connection 104a may provide two-way communication and electrical connections, and even two-way power connections. Connection 104a may include a joint 105a, configured to allow the portion above joint 105a to pivot about one or more axes (e.g., allowing either balloon 101a or payload 108a to tilt and turn). Actuation module 106a may provide a means to actively turn payload 108a for various purposes, such as improved aerodynamics, facing or tilting solar panel(s) 109a advantageously, directing payload 108a and propulsion units (e.g., propellers 107 in FIG. 1B) for propelled flight, or directing components of payload 108a advantageously.

Payload 108a may include solar panel(s) 109a, avionics chassis 110a, broadband communications unit(s) 111a, and terminal(s) 112a. Solar panel(s) 109a may be configured to capture solar energy to be provided to a battery or other energy storage unit, for example, housed within avionics chassis 110a. Avionics chassis 110a also may house a flight computer (e.g., computing device 301, as described herein), a transponder, along with other control and communications infrastructure (e.g., a controller comprising another computing device and/or logic circuit configured to control aerial vehicle 120a). Communications unit(s) 111a may include hardware to provide wireless network access (e.g., LTE, fixed wireless broadband via 5G, Internet of Things (IoT) network, free space optical network or other broadband networks). Terminal(s) 112a may comprise one or more parabolic reflectors (e.g., dishes) coupled to an antenna and a gimbal or pivot mechanism (e.g., including an actuator comprising a motor). Terminal(s) 112(a) may be configured to receive or transmit radio waves to beam data long distances (e.g., using the millimeter wave spectrum or higher frequency radio signals). In some examples, terminal(s) 112a may have very high bandwidth capabilities. Terminal(s) 112a also may be configured to have a large range of pivot motion for precise pointing performance. Terminal(s) 112a also may be made of lightweight materials.

In other examples, payload 108a may include fewer or more components, including propellers 107 as shown in FIG. 1B, which may be configured to propel aerial vehicles 120a-b in a given direction. In still other examples, payload 108a may include still other components well known in the art to be beneficial to flight capabilities of an aerial vehicle. For example, payload 108a also may include energy capturing units apart from solar panel(s) 109a (e.g., rotors or other blades (not shown) configured to be spun by wind to generate energy). In another example, payload 108a may further include or be coupled to an imaging device, such as a downward-facing camera and/or a star tracker. In yet another example, payload 108a also may include various sensors (not shown), for example, housed within avionics chassis 110a or otherwise coupled to connection 104a or balloon 101a. Such sensors may include Global Positioning System (GPS) sensors, wind speed and direction sensors such as wind vanes and anemometers, temperature sensors such as thermometers and resistance temperature detectors, speed of sound sensors, acoustic sensors, pressure sensors such as barometers and differential pressure sensors, accelerometers, gyroscopes, combination sensor devices such as inertial measurement units (IMUs), light detectors, light detection and ranging (LIDAR) units, radar units, cameras, and more. These examples of sensors are not intended to be limiting, and those skilled in the art will appreciate that other sensors or combinations of sensors in addition to these described may be included without departing from the scope of the present disclosure.

Figure 2:
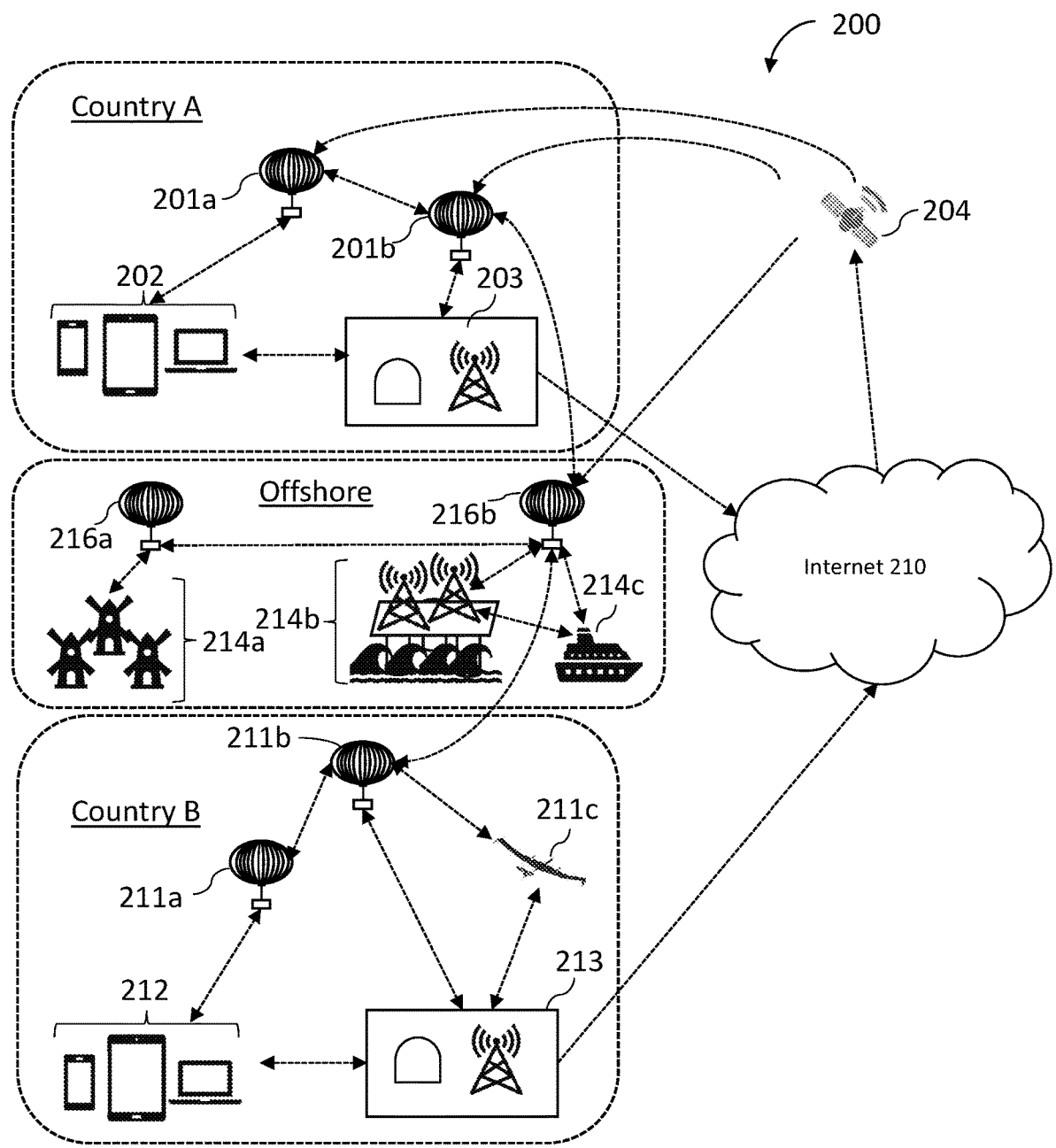
FIG. 2 is a diagram of an exemplary aerial vehicle network, in accordance with one or more embodiments.
Figure 3:
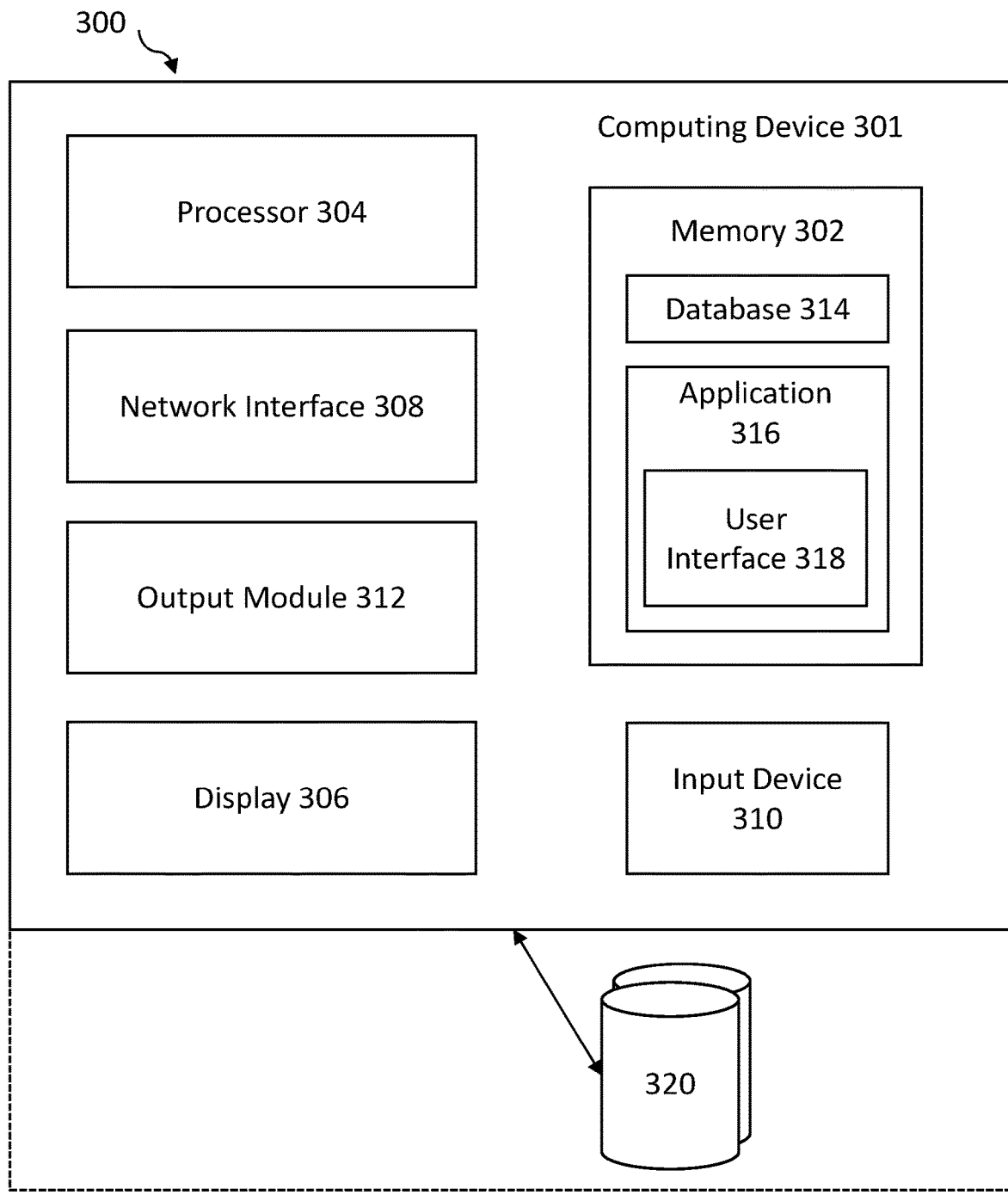
FIG. 3 is a simplified block diagram of an exemplary computing system forming part of the systems of FIGS. 1A-2, in accordance with one or more embodiments.

Ground station 114 may include one or more server computing devices 115a-n, which in turn may comprise one or more computing devices (e.g., computing device 301 in FIG. 3). In some examples, ground station 114 also may include one or more storage systems, either housed within server computing devices 115a-n, or separately (see, e.g., computing device 301 and repositories 320). Ground station 114 may be a datacenter servicing various nodes of one or more networks (e.g., aerial vehicle network 200 in FIG. 2).

FIG. 1B shows a diagram of system 150 for navigation of aerial vehicle 120b. All like-numbered elements in FIG. 1B are the same or similar to their corresponding elements in FIG. 1A, as described above (e.g., balloon 101a and balloon 101b may serve the same function, and may operate the same as, or similar to, each other). In this embodiment, aerial vehicle 120b further includes, as part of payload 108b, propellers 107, which may be configured to actively propel aerial vehicle 120b in a desired direction, either with or against a wind force to speed up, slow down, or re-direct, aerial vehicle 120b. In this embodiment, balloon 101b also may be shaped differently from balloon 101a, to provide different aerodynamic properties.

As shown in FIGS. 1A-1B, aerial vehicles 120a-b may be largely wind-influenced aerial vehicle, for example, balloons carrying a payload (with or without propulsion capabilities) as shown, or fixed wing high altitude drones (e.g., aerial vehicle 211c in FIG. 2). However, those skilled in the art will recognize that the systems and methods disclosed herein may similarly apply and be usable by various other types of aerial vehicles.

FIG. 2 is a diagram of an exemplary aerial vehicle network, in accordance with one or more embodiments. Aerial vehicle network 200 may include aerial vehicles 201a-b, user devices 202, and ground infrastructure 203, in Country A. Aerial vehicle network 200 also may include aerial vehicles 211a-c, user devices 212, and ground infrastructure 213 in Country B. Aerial vehicle network 200 also may include offshore facilities 214a-c and aerial vehicles 216a-b servicing at least said offshore facilities 214a-c. Aerial network 200 may further include satellite 204 and Internet 210. Aerial vehicles 201a-b, 211a-c, and 216a-b may comprise balloon, other floating (i.e., lighter than air), propelled or partially propelled (i.e., powered and propelled for a limited amount of time or under certain circumstances, and not propelled at other times or under other circumstances), fixed-wing, or other types of high altitude aerial vehicles, as described herein. For example, aerial vehicles 201a-b, 211a-c, and 216a-b may be the same or similar to aerial vehicles 120a-b described above. User devices 202 and 212 may include a cellular phone, tablet computer, smart phone, desktop computer, laptop computer, and/or any other computing device known to those skilled in the art. Ground infrastructure 203 and 213 may include always-on or fixed location computing device (i.e., capable of receiving fixed broadband transmissions), ground terminal (e.g., ground station 114), tower (e.g., a cellular tower), and/or any other fixed or portable ground infrastructure for receiving and transmitting various modes of connectivity described herein known to those skilled in the art. User devices 202 and 212, ground infrastructure 203 and 213, and offshore facilities 214a-c, may be capable of receiving and transmitting signals to and from aerial vehicles 201a-b, 211a-c, and 216a-b, and in some cases, to and from each other. Offshore facilities 214a-c may include industrial facilities (e.g., wind farms, oil rigs and wells), commercial transport (e.g., container ships, other cargo ships, tankers, other merchant ships, ferries, cruise ships, other passenger ships), and other offshore applications.

Aerial vehicle network 200 may support ground-to-vehicle communication and connectivity, as shown between ground infrastructure 203 and aerial vehicle 201b, as well as aerial vehicles 211b-c and ground infrastructure 213. In these examples, aerial vehicles 201b and 211b-c each may exchange data with either or both a ground station (e.g., ground station 114), a tower, or other ground structures configured to connect with a grid, Internet, broadband, and the like. Aerial vehicle network 200 also may support vehicle-to-vehicle (e.g., between aerial vehicles 201a and 201b, between aerial vehicles 211a-c, between aerial vehicles 216a-b, between aerial vehicles 201b and 216b, between aerial vehicles 211b and 216b), satellite-to-vehicle (e.g., between satellite 204 and aerial vehicles 201a-b, between satellite 204 and aerial vehicle 216b), vehicle-to-user device (e.g., between aerial vehicle 201a and user devices 202, between aerial vehicle 211a and user devices 212), and vehicle-to-offshore facility (e.g., between one or both of aerial vehicles 216a-b and one or more of offshore facilities 214a-c) communication and connectivity. In some examples, ground stations within ground infrastructures 203 and 213 may provide core network functions, such as connecting to the Internet and core cellular data network (e.g., connecting to LTE EPC or other communications platforms, and a software defined network system) and performing mission control functions. In some examples, the ground-to-vehicle, vehicle-to-vehicle, and satellite-to-vehicle communication and connectivity enables distribution of connectivity with minimal ground infrastructure. For example, aerial vehicles 201a-b, 211a-c, and 216a-b may serve as base stations (e.g., LTE eNodeB base stations), capable of both connecting to the core network (e.g., Internet and core cellular data network), as well as delivering connectivity to each other, to user devices 202 and 212, and to offshore facilities 214a-c. As such, aerial vehicles 201a-b and 211a-c represent a distribution layer of aerial vehicle network 200. User devices 202 and 212 each may access cellular data and Internet connections directly from aerial vehicles 201a-b and 211a-c.

FIG. 3 is a simplified block diagram of an exemplary computing system forming part of the systems of FIGS. 1A-2, in accordance with one or more embodiments. In one embodiment, computing system 300 may include computing device 301 and storage system 320. Storage system 320 may comprise a plurality of repositories and/or other forms of data storage, and it also may be in communication with computing device 301. In another embodiment, storage system 320, which may comprise a plurality of repositories, may be housed in one or more of computing device 301. In some examples, storage system 320 may store learned flight policies, as described herein, and other various types of information as described herein. This information may be retrieved or otherwise accessed by one or more computing devices, such as computing device 301 or computing devices 401a-n in FIG. 4, in order to perform some or all of the features described herein. Storage system 320 may comprise any type of computer storage, such as a hard-drive, memory card, ROM, RAM, DVD, CD-ROM, write-capable, and read-only memories. In addition, storage system 320 may include a distributed storage system where data is stored on a plurality of different storage devices, which may be physically located at the same or different geographic locations (e.g., in a distributed computing system such as system 400 in FIG. 4). Storage system 320 may be networked to computing device 301 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 301 also may include a memory 302. Memory 302 may comprise a storage system configured to store a database 314 and an application 316. Application 316 may include instructions which, when executed by a processor 304, cause computing device 301 to perform various steps and/or functions, as described herein. Application 316 further includes instructions for generating a user interface 318 (e.g., graphical user interface (GUI)). Database 314 may store various algorithms and/or data, including neural networks (e.g., encoding flight policies, as described herein) and data regarding wind patterns, weather forecasts, past and present locations of aerial vehicles (e.g., aerial vehicles 120a-b, 201a-b, 211a-c), sensor data, map information, air traffic information, among other types of data. Memory 302 may include any non-transitory computer-readable storage medium for storing data and/or software that is executable by processor 304, and/or any other medium which may be used to store information that may be accessed by processor 304 to control the operation of computing device 301.

Computing device 301 may further include a display 306, a network interface 308, an input device 310, and/or an output module 312. Display 306 may be any display device by means of which computing device 301 may output and/or display data. Network interface 308 may be configured to connect to a network using any of the wired and wireless short range communication protocols described above, as well as a cellular data network, a satellite network, free space optical network and/or the Internet. Input device 310 may be a mouse, keyboard, touch screen, voice interface, and/or any or other hand-held controller or device or interface by means of which a user may interact with computing device 301. Output module 312 may be a bus, port, and/or other interface by means of which computing device 301 may connect to and/or output data to other devices and/or peripherals.

In some examples computing device 301 may be located remote from an aerial vehicle (e.g., aerial vehicles 120a-b, 201a-b, 211a-c) and may communicate with and/or control the operations of an aerial vehicle, or its control infrastructure as may be housed in avionics chassis 110a-b, via a network. In one embodiment, computing device 301 is a data center or other control facility (e.g., configured to run a distributed computing system as described herein), and may communicate with a controller and/or flight computer housed in avionics chassis 110a-b via a network. As described herein, system 300, and particularly computing device 301, may be used for planning a flight path or course for an aerial vehicle based on wind and weather forecasts to move said aerial vehicle along a desired heading or within a desired radius of a target location. Various configurations of system 300 are envisioned, and various steps and/or functions of the processes described below may be shared among the various devices of system 300, or may be assigned to specific devices.

Figure 4:
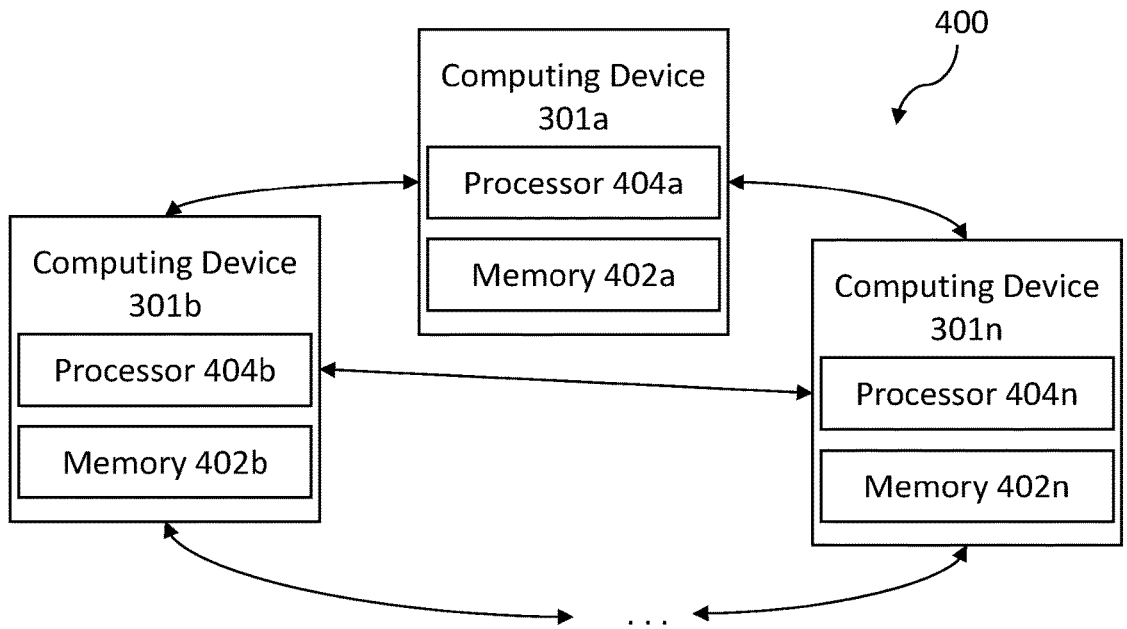
FIG. 4 is a simplified block diagram of an exemplary distributed computing system, in accordance with one or more embodiments.

FIG. 4 is a simplified block diagram of an exemplary distributed computing system, in accordance with one or more embodiments, comprising two or more computing devices 301*a-n*. In some examples, each of 301*a-n* may comprise one or more of processors 404*a-n*, respectively, and one or more of memory 402*a-n*, respectively. Processors 404*a-n* may function similarly to processor 304 in FIG. 3, as described above. Memory 402*a-n* may function similarly to memory 302 in FIG. 3, as described above.

Figure 5A:
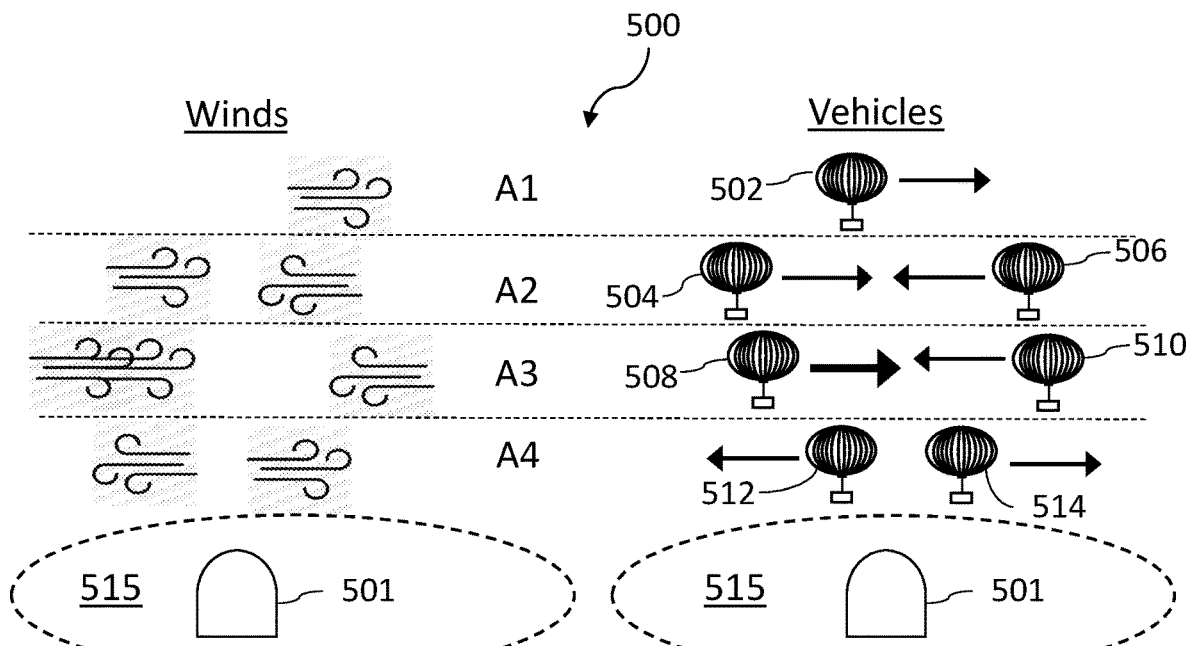
FIG. 5A is a diagram illustrating a group of aerial vehicles providing service coverage to a target area according to winds favorable for station seeking, in accordance with one or more embodiments.

FIG. 5A is a diagram illustrating a group of aerial vehicles providing service coverage to a target service area according to winds favorable for station seeking, in accordance with one or more embodiments. Such service coverage may be for connectivity services, observing earth, and meteorological data collection, among other services. In some examples, aerial vehicles 502-514 may be configured to provide wireless broadband, Internet, optical, or other connectivity services to areas that they may fly over, such as target service area 515 (i.e., and any wireless devices within), which may be within a given radius or perimeter of station 501. In other examples, some or all of aerial vehicles 502-514 may be configured to observe various aspects of the portion of earth represented in, or collect meteorological data for, target service area 515, and to send the observation and meteorological data to station 501 or other network or ground station for storage and processing. In an example, station 501 may include a ground station, backhaul unit, or other ground infrastructure that may be in data communication with one or more of aerial vehicles 502-514, as described herein. Any two or more of aerial vehicles 502-514 may be in data communication with each other, as well as provide data connectivity to users in target service area 515, which may be a radius or perimeter around station 501.

On the left side of diagram 500, winds in a region of the atmosphere over station 501 are shown at varying altitudes A1-A4 for a time period. On the right side of diagram 500, aerial vehicles 502-514 are shown over the same region of the atmosphere with arrows representing vectors along which aerial vehicles 502-514 are traveling within that time period, each vector corresponding to a wind direction and relative speed at a corresponding altitude. In an example, it may be determined, using techniques described above, that aerial vehicles 502-514 can provide at least a threshold probability of coverage to target service area 515 for a time period, due to the variance in winds (i.e., direction, speed, or both) among and within altitudes A1-A4. Thus, controllers for each of aerial vehicles 502-514 may be operating according to a station seeking flight policy.

In some examples, a station seeking flight policy may be a neural network encoding a flight policy optimizing for remaining within target service area 515 or other predetermined radius surrounding station 501. Said station seeking flight policy may output a set of actions for one or more of aerial vehicles 502-514 to take, or a set of commands configured to cause an aerial vehicle to take certain actions, in order to remain within or near target service area 515. Example actions may include a change in altitude, a stay in altitude, a termination of flight (e.g., selective cut of balloon portion and/or layer, release of air or gas from a balloon or airship, etc.). Example commands may include spinning an ACS fan motor at a predetermined number of watts to increase or decrease density, changing a mode of operation (e.g., switching to a daytime or nighttime mode for one or more components of the aerial vehicle), changing a flight controller (e.g., in certain situations wherein the flight controller is not being assigned offboard), start/stop/change lateral propulsion (e.g., power setting on/off/increase/decrease for a fan, heading to point a fan, etc.), among other commands.

In other examples, a station seeking flight policy may be a different type of system or model configured to select a heading and/or adjust an altitude of an aerial vehicle (e.g., one or more of aerial vehicles 502-514, or any other aerial vehicle described herein) based on input indicating a location and altitude of an aerial vehicle and wind pattern data regarding winds at a location and altitude of said aerial vehicle. In some examples, a station seeking flight policy may be configured to determine a vector from a location of an aerial vehicle to a destination (e.g., a location at or within a target service location) and plan a path for the aerial vehicle based on the vector.

For example, at altitude A1, the arrow next to aerial vehicle 502 indicates the vector (i.e., direction indicated by direction of arrowhead and relative speed indicated by a thickness of the arrow) that aerial vehicle 502 is traveling, the vector corresponding to a wind heading and relative speed at altitude A1. In this example, once aerial vehicle 502 passes out of, or near to an outer edge of, target service area 515 (e.g., surrounding station 501), its controller may direct aerial vehicle 502 to change altitudes (e.g., to A2 or A3) to travel back into target service area 515 to continue providing connectivity services according to a connectivity service objective. In another example, at altitude A2, aerial vehicles 504 and 506 are heading toward each other at similar speeds due to the countervailing winds at altitude A2. In this example, prior to making contact with each other, a controller for one or both of aerial vehicles 504 and 506 may direct either or both to change its altitude (e.g., to A1 or A4) to travel away from the other. In an example, the winds at altitude A3 blowing in a direction (i.e., to the right) are traveling at a higher speed, and thus aerial vehicle 508 is traveling in the direction at a higher speed.

Figure 5B:
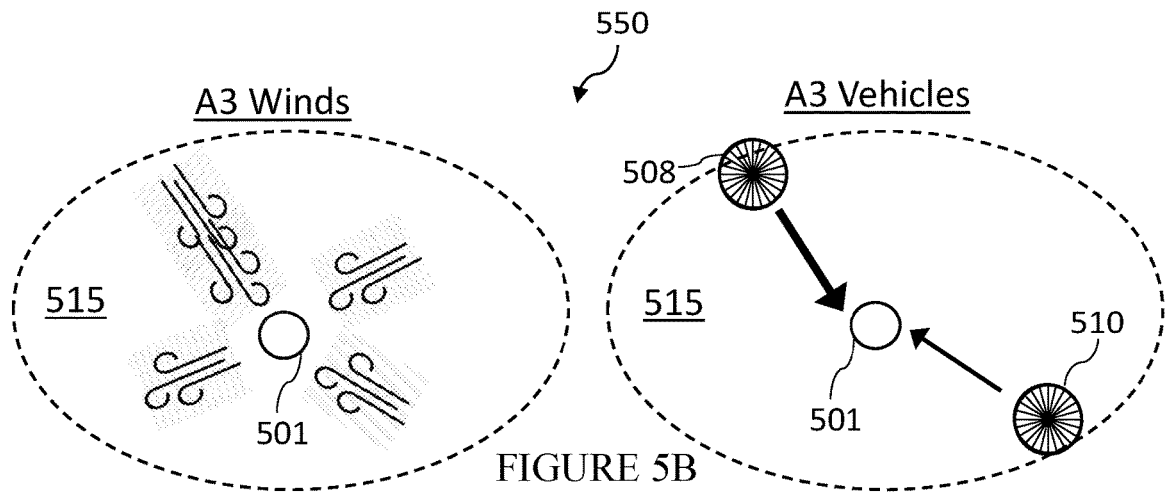
FIGS. 5B-5D are top down views of winds and aerial vehicles at various altitudes shown in FIG. 5A, in accordance with one or more embodiments.
Figure 5C:
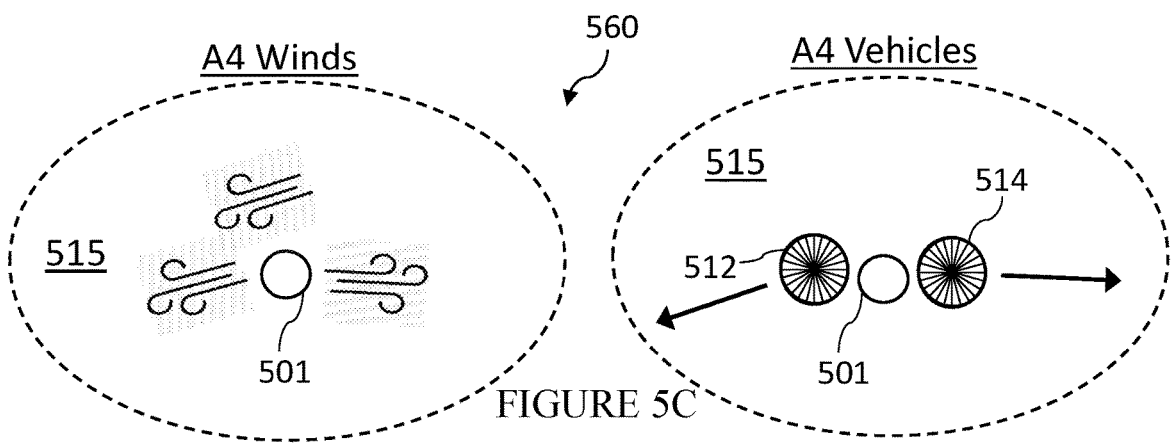
Figure 5D:
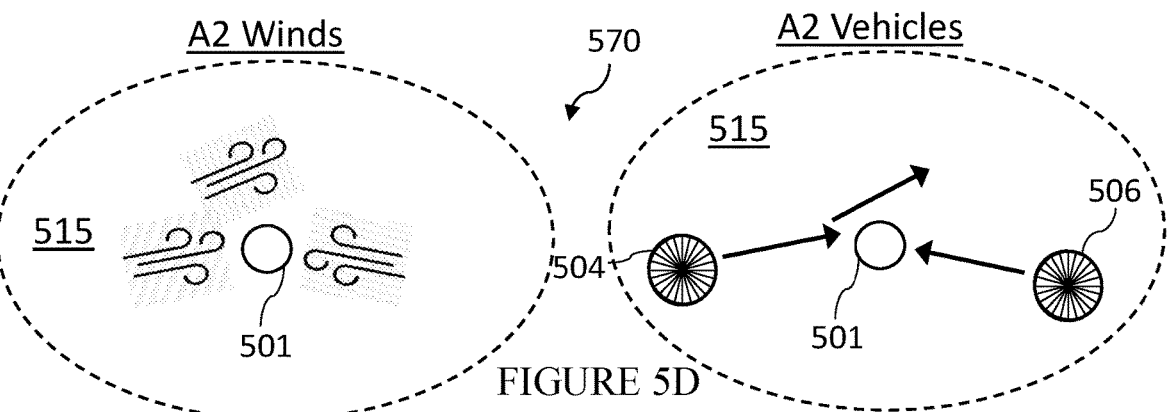

FIGS. 5B-5D are top down views of winds and aerial vehicles at various altitudes shown in FIG. 5A, in accordance with one or more embodiments. For example, FIG. 5B on the right shows aerial vehicles 508 and 510 at altitude A3 in target service area 515, and on the left, the direction and relative magnitude of winds that are influencing the direction and relative speed of aerial vehicles 508 and 510, as well as direction and relative speed of other winds in target service area 515. In FIG. 5C on the right, aerial vehicles 512 and 514 are traveling at altitude A4 within target service area 515 in directions and relative speeds according to wind directions and relative speeds shown on the left. Similarly, in FIG. 5D on the right, aerial vehicles 504 and 506 are traveling at altitude A2 within target service area 515 in directions and relative speeds according to wind directions and relative speeds shown on the left. In this example, aerial vehicle 504 may get picked up by winds traveling in a slightly altered direction (e.g., toward the top right of page) once aerial vehicle 504 nears station 501, thus avoiding contact with aerial vehicle 506 without changing altitude. In another example, one or both of aerial vehicles 504 and 506 may be commanded to change altitude prior to reaching or crossing station 501 to change a direction and/or speed of travel.

Figure 6:
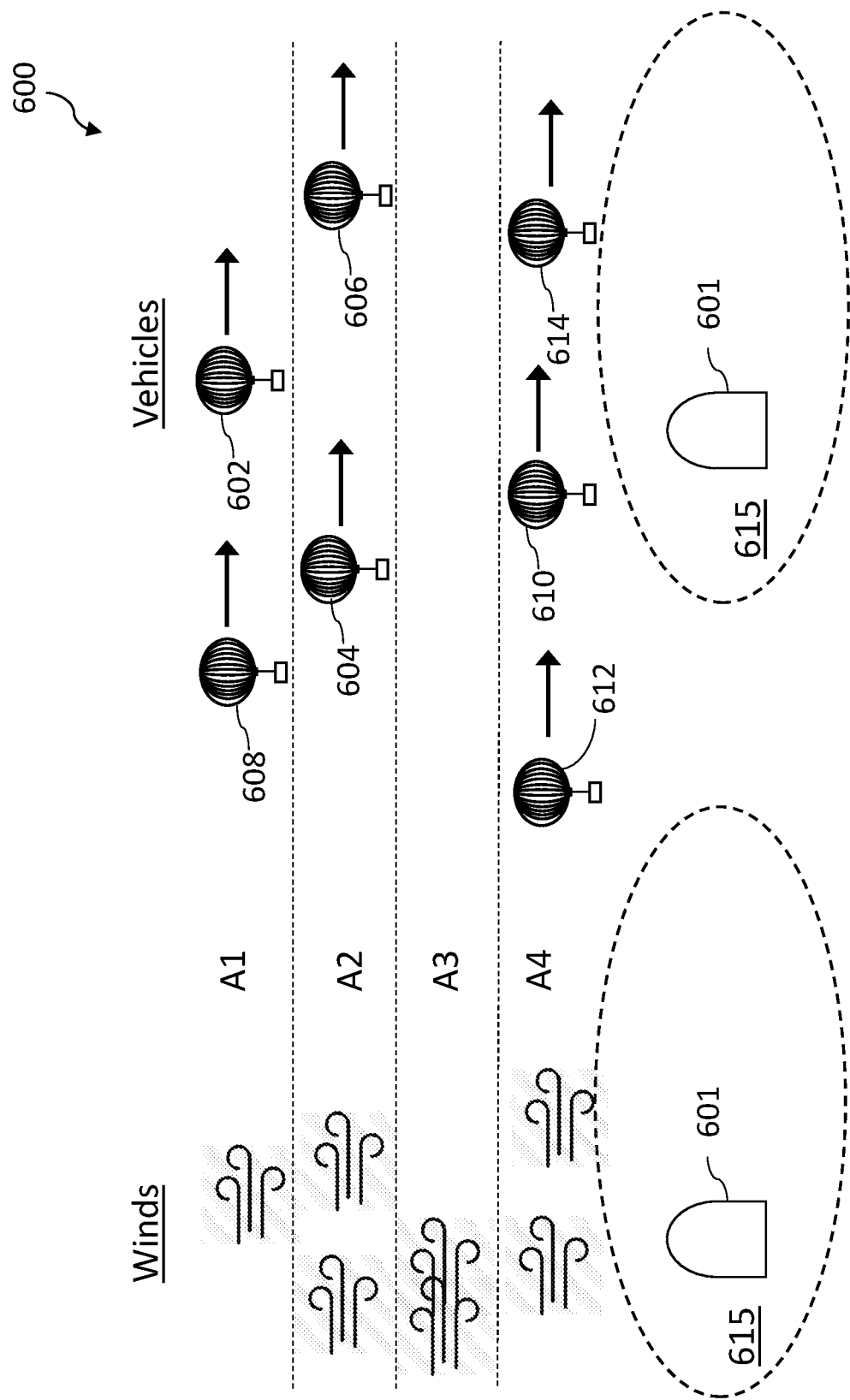
FIG. 6 is a diagram illustrating a group of aerial vehicles providing service coverage to a target area according to winds not favorable for station seeking, in accordance with one or more embodiments.

FIG. 6 is a diagram illustrating a group of aerial vehicles providing service coverage to a station according to winds not favorable for station seeking, in accordance with one or more embodiments. Aerial vehicles 602-614 may include the same or similar components and function similarly to aerial vehicles 502-514, but with respect to target service area 615 (i.e., and any wireless devices within), which may be within a given radius or perimeter of station 601. Station 601 may include similar components and function similarly to station 501. In diagram 600, the winds in altitudes A1-A4 for a time period may all be blowing in the same direction, and thus not favorable for station seeking. Using the techniques described herein, a flight allocator or dispatcher system may deploy a larger number of vehicles to provide the same target level of coverage (i.e., the service coverage objective) in times of non-favorable station seeking winds, where a fewer number of vehicles might suffice in better station seeking winds. The system can automatically determine the number of vehicles that should be recruited to do so. For example, it may be determined, using techniques described herein, that aerial vehicles 602-614 cannot provide a minimum threshold probability of coverage to target service area 615 for the time period, due to the lack of variance in winds among and within altitudes A1-A4. In this example, controllers for aerial vehicles 602-614 may operate according to a different flight policy, such as one optimized for an aerial vehicle to travel across target service area 615, and to return to target service area 615 periodically. For example, aerial vehicles 606 and 614 may be scheduled to arrive within target service area 615 and to provide connectivity services to target service area 615 on day 1. Then aerial vehicles 602 and 610 may be scheduled to arrive within target service area 615 on day 2, within a window of time before and/or after aerial vehicles 606 and 614 are leaving target service area 615. In an example, aerial vehicles 604 and 608 may be scheduled to arrive at target service area 615 later on day 2 to provide additional coverage (e.g., during a time period when there is an expectation of higher demand for connectivity services), or to take over providing connectivity services as aerial vehicles 606 and 614 are heading toward the opposite end of, or exiting, target service area 615. In an example, aerial vehicle 612 may be scheduled to arrive at target service area 615 on day 3. In some examples, aerial vehicles 602-614 may avoid altitude A3 where the winds are stronger (i.e., faster), and where they would be blown out of target service area 615 at a faster rate, as this may shorten the period of time an aerial vehicle may provide connectivity services to target service area 615. On other examples, if there are sufficient aerial vehicles available to service target service area 615 such that they may overlap in service days, one or more of aerial vehicles 602-614 may be directed or caused to travel in altitude A3 to avoid overcrowding at other altitudes.

In some examples, a flight policy may direct one or more of aerial vehicles 602-614 to loop back to target service area 615 every few days (e.g., a number of days less than or equal to N number of vehicles to ensure there always will be at least one aerial vehicle in service over target service area 615), such that this group of aerial vehicles 602-614 may continuously provide connectivity services to target service area 615. In some examples, the loop back to target service area 615 may be a longer or shorter loop depending on one or more factors, including without limitation: the number of vehicles available, the service objective (e.g., a higher or lower level of desired coverage at different times of the day or different days of the week or month may mean at certain times more than one vehicle will be scheduled to provide coverage on the same day or with overlapping service time periods (e.g., when service demand is higher), and at other times it is ok to have a gap in service between a vehicle exiting target service area 615 and a vehicle entering target service area 615 (e.g., when service demand is lower)), the wind patterns (e.g., if winds are more uniform over a larger area, more vehicles may need to be provided to fly a farther loop to return to target service area 615; if winds are faster, more vehicles may need to be scheduled as each vehicle will be blown out of target service area 615 at a faster rate and thus each vehicle will provide service for a shorter period of time).

In some examples, a service coverage planning system may switch back to station seeking based on a probabilistic approach when winds, and thus calculations of probabilities of coverage, change. In other examples, a service coverage planning system also may switch back to a probabilistic approach where fewer vehicles are allocated to service target service area 615 (e.g., due to overall fleet availability, inability to dispatch more vehicles to the area at the appropriate times due to wind patterns elsewhere, and the like). Where a more limited group of vehicles are available to service target service area 615 in a scheduled loop as described above, there may be a lower probability of coverage threshold to meet in order for the system to choose station seeking over other methods.

In some examples, the group of aerial vehicles shown in FIGS. 5A-5D and FIG. 6 may be a homogeneous group of aerial vehicles comprising identical or nearly identical features and characteristics (e.g., they may all comprise balloons of the same size and shape in one example or all comprise a gliding vehicle of the same size and shape in another example, they may run the same or similar software, they may all have the same or similar hardware components, etc.). In other examples, the group of aerial vehicles shown in FIGS. 5A-5D and FIG. 6 may be a heterogeneous group of aerial vehicles, including different types of lighter-than-air vehicles, as described in more detail above, and having different features and characteristics. For example, a heterogeneous group of aerial vehicles may include a combination of balloons, airships, gliders, high altitude drones, or other high altitude aircraft, with differing methods of flight control on a spectrum from passive flight to powered propelled flight. In some cases, some of the types of aerial vehicles in the heterogeneous group may be more costly to power and operate than other types of aerial vehicles in the heterogeneous group. In an example, the methods described herein may select a lower cost vehicle to perform a service coverage objective when the winds are favorable for station seeking by the lower cost vehicles. If the winds are not favorable for station seeking, or if they change from a favorable station seeking wind pattern, then the systems described herein may allocate or dispatch higher cost vehicles (e.g., vehicles that are at least powered in part and are not wholly wind-driven) to perform the service coverage objective for that target location.

In either a homogeneous or heterogeneous group, the aerial vehicles may still comprise non-interdependent vehicles (e.g., being launched or redirected from different locations at different times having differing probabilities of arriving at a target service area at different parts of a target time window by differing paths).

Figure 7A:
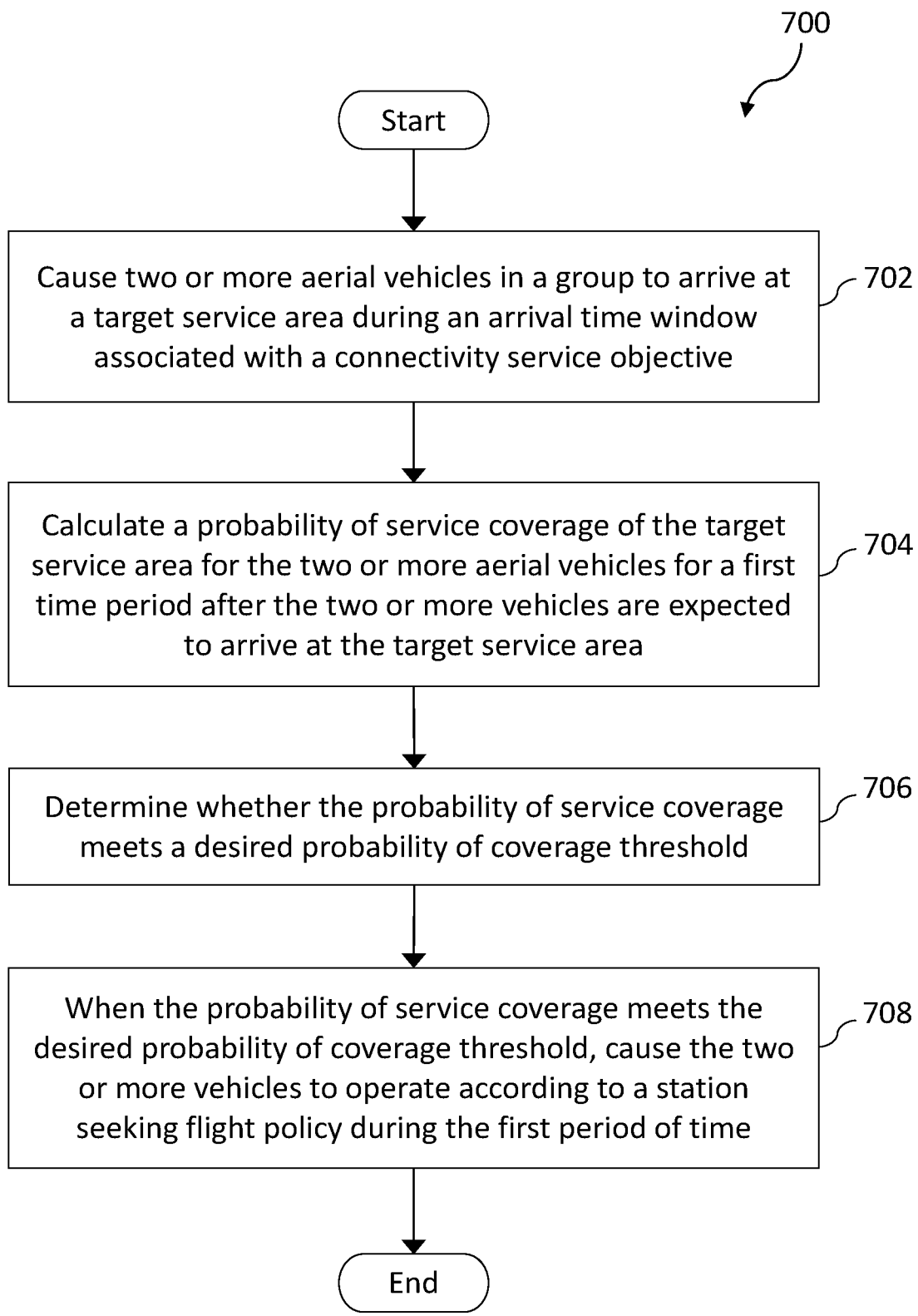
FIG. 7A-7B are flow diagrams illustrating methods for providing service coverage by a group of aerial vehicles using a probabilistic approach, in accordance with one or more embodiments.
Figure 7B:
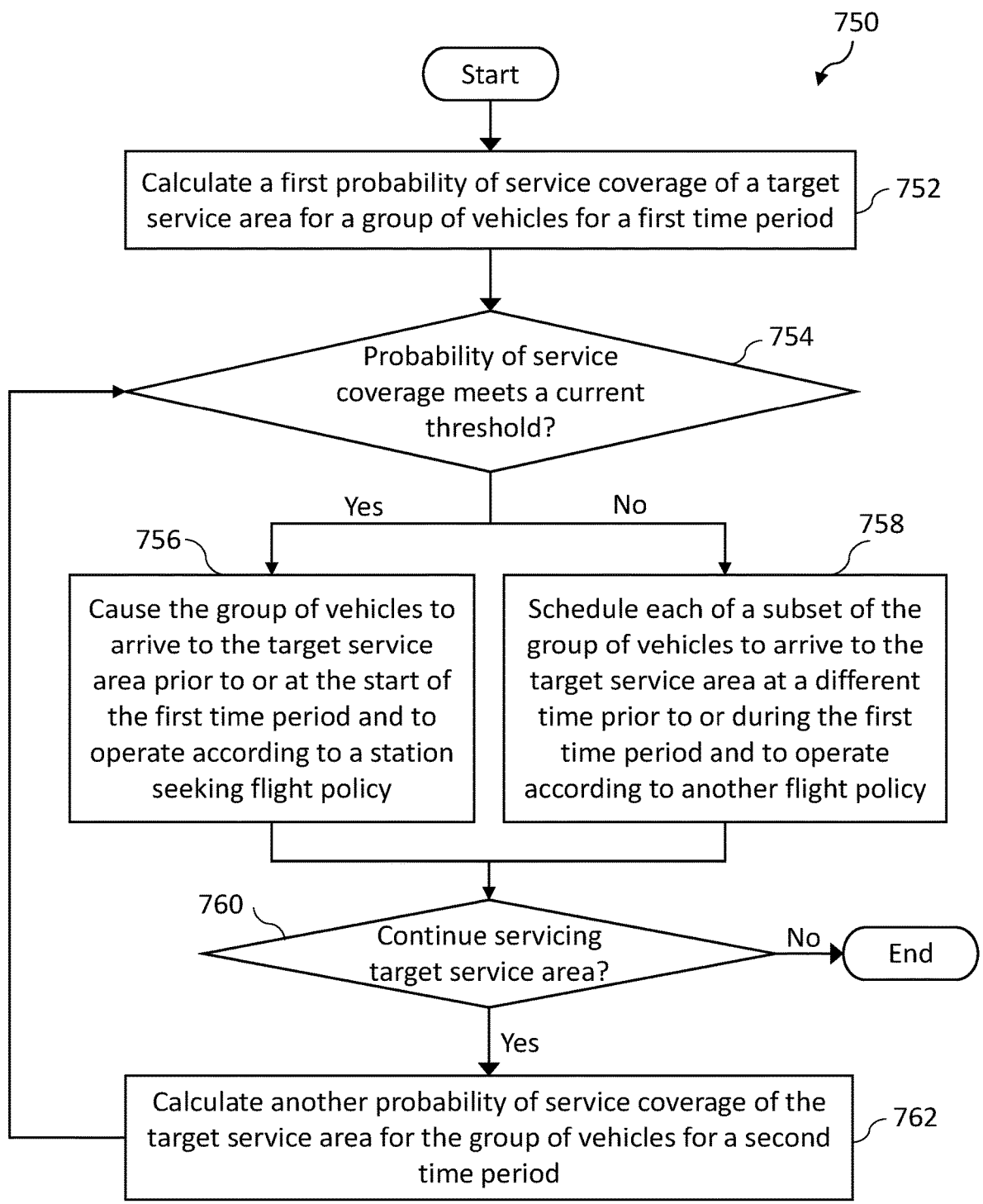

FIG. 7A-7B are flow diagrams illustrating methods for providing service coverage by a group of aerial vehicles using a probabilistic approach, in accordance with one or more embodiments. In FIG. 7A, method 700 begins with causing two or more aerial vehicles in a group to arrive at a target service area during an arrival time window associated with a connectivity service objective at step 702. In some examples, the arrival time window may coincide with a service start date or time for the connectivity service objective, or with other timed aspects of the connectivity service objective. In some examples, the connectivity service objective may include a desired probability of service coverage of the target service area. The connectivity service objective further may specify desired levels of service (e.g., based on historical, known, or anticipated demand for connectivity service), which may differ for different times of a day, days of a week or month, or other defined periods, and may include blackout periods where service is not desired. In some examples, the connectivity service objective further may include secondary service objectives, such as exploring nearby service areas, gathering additional usage, weather, and other data for a target service area or nearby service areas, and other secondary objectives. A probability of service coverage of the target service area may be calculated for the two or more aerial vehicles for a first time period after the two or more vehicles are expected to arrive at the target service area at step 704. A determination may be made whether the probability of service coverage meets a desired probability of coverage threshold at step 706. When the probability of service coverage meets the desired probability of coverage threshold, the two or more vehicles may be caused to operate according to a station seeking flight policy during the first period of time at step 708. As described above, in some cases, a separate determination may be made whether a forecasted wind pattern itself is favorable for station seeking, wherein the two or more vehicles may be controlled according to the station seeking flight policy in response to said determination based on the forecasted wind pattern, either in addition to or instead of the determination of the probability of service coverage meeting the desired probability of coverage threshold.

In some examples, when the probability of service coverage does not meet the probability of coverage threshold, a minimum number of additional vehicles necessary to meet the threshold may be determined, and one or more additional vehicles equal to said minimum number of additional vehicles may be caused to travel to the target service area to station seek.

In FIG. 7B, method 750 begins with calculating a first probability of service coverage of a target service area for a group of vehicles for a first time period at step 752. A determination may be made whether the probability of service coverage meets a current threshold probability of coverage at step 754. In some examples, the threshold probability of coverage may be predetermined and unchanging. In other examples, the threshold probability of coverage may be dynamic based on factors described above, such as wind forecasts, determinations of whether a service objective may be met using other flight policies, and the like. If yes, the group of vehicles may be caused to arrive to the target service area prior to or at the start of the first time period and to operate according to a station seeking flight policy at step 756. If no, then each of a subset of the group of vehicles may be scheduled to arrive to the target service area at a different time prior to or during the first time period and to operate according to another (e.g., non-station seeking) flight policy at step 758. For example, each of a subset of the group of vehicles may have a different arrival date or time window. A first subset may be scheduled to arrive at a date and/or time window and service the target service area for a given day or time period, until another subset of the group of vehicles is scheduled to arrive to the target service area. Said first subset may be scheduled to return (e.g., loop back) to the target service area after a certain other time period (e.g., a number of days, on a specified day in the future, within a specified time window each day for a number of days, etc.). A determination may be made whether to continue servicing the target service area at step 760. In some examples, this may involve determining whether a connectivity service objective has been completed or fulfilled. If yes, another probability of service coverage of the target service area may be calculated for the group of vehicles for a second time period at step 762, and the process may return to step 754 to determine whether this other probability of service calculation for the second time period meets the current threshold. If no, the process may terminate. In some examples, the process may include a step (not shown) determining how many additional aerial vehicles may be needed to achieve the service coverage objective, and causing the determined number of additional vehicles needed to be deployed to the group. In other examples, wherein the group comprises a heterogeneous group of vehicles, the process may include another step (not shown) wherein a first type of vehicle (e.g., lower cost, wind-driven) is selected to service the target service area when the probability of service coverage meets the current threshold, and a second type of vehicle (e.g., higher cost, powered and/or propelled) is selected to service the target service area when the probability of service coverage does not meet the current threshold.

It would be recognized by a person of ordinary skill in the art that some or all of the steps of methods 700 and 750, as described above, may be performed in a different order or sequence, repeated, and/or omitted without departing from the scope of the present disclosure.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for controlling a group of aerial vehicles to meet a connectivity service objective, the method comprising:
   causing two or more aerial vehicles in the group to arrive at a target service area during a given arrival time window associated with the connectivity service objective;
   calculating a probability of service coverage of the target service area for the two or more aerial vehicles for a first time period after the two or more aerial vehicles are expected to arrive at the target service area;
   determining whether the probability of service coverage meets a probability of coverage threshold; and
   when the probability of service coverage meets the probability of coverage threshold, causing the two or more aerial vehicles to operate according to a station seeking flight policy during the first time period.

2. The method of claim 1, wherein the connectivity service objective further specifies a desired level of service.

3. The method of claim 2, wherein the desired level of service is based on a demand for connectivity service.

4. The method of claim 1, wherein causing the two or more aerial vehicles to operate according to the station seeking flight policy occurs in response to a determination that the probability of service coverage meets the probability of coverage threshold.

5. The method of claim 1, further comprising determining whether a forecasted wind pattern is favorable for station seeking, wherein causing the two or more aerial vehicles to operate according to the station seeking flight policy occurs in response to a determination that the forecasted wind pattern is favorable for station seeking.

6. The method of claim 1, further comprising:
   when the probability of service coverage does not meet the probability of coverage threshold:
      calculating a minimum number of additional aerial vehicles necessary to meet the probability of coverage threshold;
      causing one or more additional aerial vehicles equal to the minimum number of additional aerial vehicles to travel to the target service area; and
      causing the one or more additional aerial vehicles to operate according to a station seeking flight policy during a remainder of the first time period.

7. The method of claim 1, wherein the group of aerial vehicles comprises two or more heterogeneous aerial vehicles.

8. The method of claim 1, wherein the group of aerial vehicles comprises two or more non-interdependent aerial vehicles.

9. The method of claim 1, wherein the group of aerial vehicles comprises at least one balloon.

10. The method of claim 1, wherein the group of aerial vehicles comprises at least one fixed wing high altitude aerial vehicle.

11. The method of claim 1, wherein the given arrival time window overlaps with a start of connectivity service specified by the connectivity service objective.

12. The method of claim 1, wherein the first time period overlaps with the given arrival time window.

13. The method of claim 1, wherein the station seeking flight policy comprises a neural network encoding a flight policy optimizing for remaining within the target service area for the first time period.

14. The method of claim 1, wherein the station seeking flight policy is configured to output a set of actions for the two or more aerial vehicles to take in order to remain within or near the target service area for the first time period.

15. The method of claim 1, wherein the station seeking flight policy is configured to output a set of commands configured to cause the two or more aerial vehicles to take one or more actions in order to remain within or near the target service area for the first time period.

16. The method of claim 1, wherein the station seeking flight policy is configured to select a heading based on input indicating:
   a location and an altitude of each of the two or more aerial vehicles,
   wind pattern data for the location and the altitude, and
   a destination, wherein the destination is associated with the target service area.

17. The method of claim 1, wherein the station seeking flight policy is configured to adjust an altitude of each of the two or more aerial vehicles.

18. The method of claim 1, further comprising:
   selecting a subgroup of lower cost aerial vehicles to service the target service area based on a determination that the probability of service coverage by the subgroup of lower cost aerial vehicles meets the probability of coverage threshold for a second time period; and
   causing the subgroup of lower cost aerial vehicles to service the target service area for the second time period,
   wherein the group of aerial vehicles comprises a heterogeneous group of aerial vehicles.

19. The method of claim 1, further comprising:
   selecting a subgroup of higher cost aerial vehicles to service the target service area based on a determination that the probability of service coverage by a subgroup of lower cost aerial vehicles does not meet the probability of coverage threshold for a second time period; and
   causing the subgroup of higher cost aerial vehicles to service the target service area for the second time period,
   wherein the group of aerial vehicles comprises a heterogeneous group of aerial vehicles.

20. A computer system comprising:
   a memory; and
   one or more processors configured to perform operations for controlling a group of aerial vehicles to meet a connectivity service objective, the one or more processors configured to:
      cause two or more aerial vehicles in the group to arrive at a target service area during a given arrival time window associated with the connectivity service objective;
      calculate a probability of service coverage of the target service area for the two or more aerial vehicles for a first time period after the two or more aerial vehicles are expected to arrive at the target service area;
      determine whether the probability of service coverage meets a probability of coverage threshold; and
      when the probability of service coverage meets the probability of coverage threshold, cause the two or more aerial vehicles to operate according to a station seeking flight policy during the first time period.

21. The method of claim 1, wherein the given arrival time window coincides with a service start date or time for the connectivity service objective, and the connectivity service objective specifies desired levels of service which differ for different times of day and time periods, wherein the time periods include blackout periods where service is not desired.

22. The computer system of claim 20, wherein the given arrival time window coincides with a service start date or time for the connectivity service objective, and the connectivity service objective specifies desired levels of service which differ for different times of day and time periods, wherein the time periods include blackout periods where service is not desired.

\* \* \* \* \*